United States Patent
Nguyen et al.

(10) Patent No.: US 10,567,294 B2
(45) Date of Patent: Feb. 18, 2020

(54) DISTRIBUTED LOAD-CONTROL IN MULTI-HOP NETWORKS

(71) Applicant: Itron Global SARL, Liberty Lake, WA (US)

(72) Inventors: Viet-Hung Nguyen, Saint-Mande (FR); Iman Mayassa Zendjebil, Courbevoie (FR); Hussein Kdouh, Paris (FR); Bruno Andrianasolo, Brerigny sur Orge (FR)

(73) Assignee: Itron Global SARL, Liberty Lake, WA (US)

( * ) Notice: Subject to any disclaimer, the term of this patent is extended or adjusted under 35 U.S.C. 154(b) by 0 days.

(21) Appl. No.: 16/024,365

(22) Filed: Jun. 29, 2018

(65) Prior Publication Data
US 2020/0007452 A1 Jan. 2, 2020

(51) Int. Cl.
 H04L 12/26 (2006.01)
 H04L 12/825 (2013.01)
 H04L 12/761 (2013.01)
 H04L 12/801 (2013.01)

(52) U.S. Cl.
 CPC .............. *H04L 47/25* (2013.01); *H04L 45/16* (2013.01); *H04L 47/15* (2013.01); *H04L 47/17* (2013.01)

(58) Field of Classification Search
 CPC ....... H04L 47/10; H04L 47/11; H04L 47/135; H04L 47/26; H04L 47/266
 USPC .......................................... 370/229, 232, 236
 See application file for complete search history.

(56) References Cited

U.S. PATENT DOCUMENTS

| | | | |
|---|---|---|---|
| 5,319,638 A | | 6/1994 | Lin |
| 5,940,370 A | * | 8/1999 | Curtis ................. H04L 12/5602 370/231 |
| 6,084,856 A | * | 7/2000 | Simmons ................ H04L 49/90 370/235 |
| 6,208,619 B1 | * | 3/2001 | Takeuchi ................ H04L 47/10 370/229 |

(Continued)

OTHER PUBLICATIONS

Enigo et al., "An Energy Efficient Congestion Control Protocol for Wireless Sensor Networks," 2009 IEEE International Advance Computing Conference, Mar. 6-7, 2009, 6 pages.

(Continued)

*Primary Examiner* — Dmitry Levitan
(74) *Attorney, Agent, or Firm* — Lee & Hayes, P.C.

(57) ABSTRACT

Techniques for controlling packet transmission levels in a multi-hop network may be performed in a distributed manner. Load-control functionality may be distributed among a plurality of nodes within a network, allowing such nodes to send feedback to upstream nodes, and receive feedback from downstream nodes. In an example, received packets are measured, such as by summing sizes of received packets over time, to determine a received traffic-level. Transmitted packets are measured, such as by summing sizes of transmitted packets over time, to determine a transmitted traffic-level. Feedback may be sent to at least one source of the received packets based at least in part on the received traffic-level and the transmitted traffic-level. The feedback may indicate a desired rate for the sender to transmit. A node may receive data from upstream node(s) and from an internal device, such as a metrology unit. Both data sources may be controlled by feedback.

20 Claims, 5 Drawing Sheets

(56) References Cited

U.S. PATENT DOCUMENTS

| | | | | |
|---|---|---|---|---|
| 6,324,165 | B1* | 11/2001 | Fan | H04L 12/5602 370/232 |
| 7,180,857 | B2* | 2/2007 | Kawakami | H04L 47/10 370/231 |
| 7,672,233 | B2 | 3/2010 | Koch et al. | |
| 7,729,250 | B2* | 6/2010 | Matoba | H04L 47/10 370/230.1 |
| 7,961,621 | B2* | 6/2011 | Bergamasco | H04L 47/10 370/236 |
| 8,004,981 | B2* | 8/2011 | Bergamasco | H04L 12/66 370/231 |
| 8,121,038 | B2* | 2/2012 | Bergamasco | H04L 47/10 370/236 |
| 9,042,230 | B2* | 5/2015 | Edsall | H04L 47/30 370/235 |
| 9,166,925 | B2* | 10/2015 | Birke | H04L 47/52 |
| 9,654,410 | B2* | 5/2017 | Birke | H04L 47/52 |

OTHER PUBLICATIONS

The PCT Search Report and Written Opinion dated Sep. 18, 2019 for PCT Application No. PCT/US2019/039189, 11 pages.

Wang et al, "Priority-based Congestion Control in Wireless Sensor Networks", Sensor Networks, vol. 1, Ubiquitous and Trustworthy Computting, IEEE International Conference on Taichung,Taiwan, Jun. 5-7, 2006, Piscataway, NJ, USA, pp. 22-31.

Yaghmaee et al, "Priority-based rate control for service differentiation and congestion control in wireless multimedia sensor networks", Computer Networks, vol. 53, No. 11, Elsevier, Amsterdam, NL, Jul. 28, 2009, pp. 1798-1811.

* cited by examiner

DISTRIBUTED LOAD-CONTROL IN MULTI-HOP NETWORKS

BACKGROUND

In a heterogeneous network, different types of devices may support different data transfer rates. Accordingly, a single communications bandwidth that is fixed between some or all network nodes may not be possible and/or efficient. In some networks, traffic load-control algorithms may utilize techniques to size a contention window as a tool to control aspects of data-transfer. While such techniques have merit, increased traffic on networks demands increasingly better network load-control.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components. Moreover, the figures are intended to illustrate general concepts, and not to indicate required and/or necessary elements.

DETAILED DESCRIPTION

Overview

The disclosure describes techniques for distributed load-control within a network environment. In an example, the techniques are applied in a distributed manner, so that a plurality of nodes send and respond to feedback sent between nodes having data-transmission links. In an example, if a node is receiving more data than it is able to transmit, its buffers may be filling up. To prevent buffer overflow, the node may send feedback to node(s) sending the received data, indicating that a slow-down is requested. Such feedback may be allowed to expire and/or countermanding feedback may be sent. In an example, if a node has extra capacity to receive and/or transmit data, it may countermand previously-sent slow-down feedback, to thereby increase data throughput. In another example, slow-down feedback sent by a node may expire, allowing automatic resumption of a higher data-transmission rate. After expiration, depending on circumstances, the node's buffer may again start to overfill. If so, further slow-down feedback may be sent. If not, the node may continue at a higher data transmission rate. In some examples, the number of nodes, or types of those nodes, sending data to a particular node may change with time, causing the need for the node to send feedback, countermand previously sent feedback, and/or let feedback expire.

The distributed load-control techniques have a number of advantages that reduce required radio-frequency (RF) spectrum and/or bandwidth use, reduce electrical and/or battery consumption, reduce overall data transmission, reduce a number of unreceived packets, reduce a number of packet re-transmissions, and that provide other benefits. In an example, using the techniques described herein, a network node is able to prevent buffer overrun by sending feedback to nodes sending data, and thereby avoid requesting retransmission. In a second example, a network may experience fewer overall packet transmissions, resulting in fewer RF signals and quieter RF spectrum, and correspondingly higher transmission success for those transmissions that were sent. Packets, data packets, data, bits, bytes, frames, and/or segments, etc., may be used herein as a generic reference to an appropriate protocol data unit(s) (PDU). Accordingly, "packets" can mean any PDU. Also, while feedback comprising a request for a slow-down of data transmission rates is discussed, in some networks and applications such techniques may be equally applied to requests for a speed-up of data transmission rates.

Example System and Techniques

Figure 1:
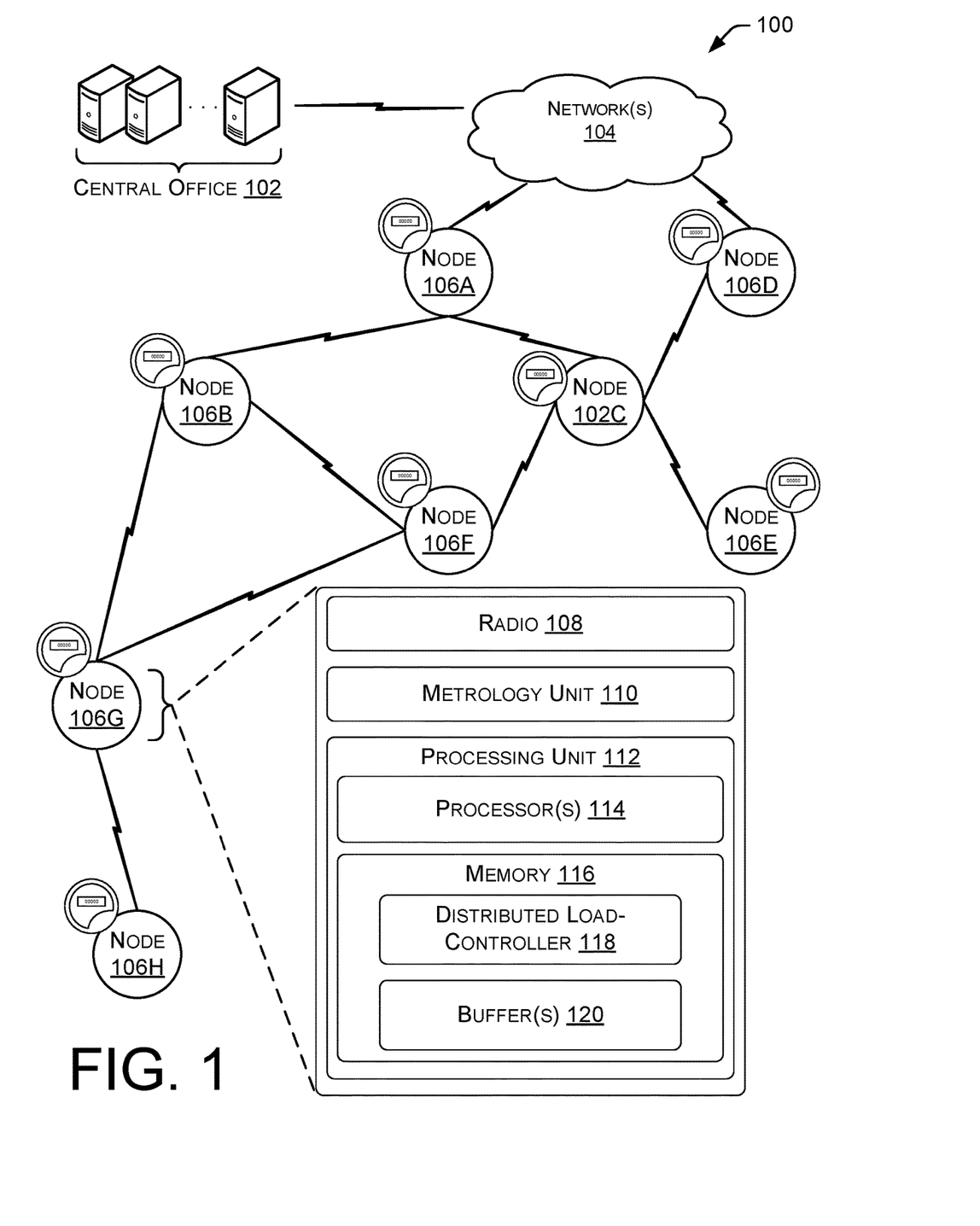
FIG. 1 is a block diagram showing an example network and example detail of a network node.

FIG. 1 shows an example network 100 configured for unicast, multicast, and/or broadcast transmissions. The example network 100 is shown as an RF network, but could alternatively be configured, fully or partially, as a wired or wireless network. The nodes of the network 100 may be battery-powered or mains-powered. Additionally, the nodes of the network 100 may be associated with devices of a smart electrical grid, or may be associated with any network involving data flow within the internet, internet of things, proprietary network(s), standardized networks, etc. In an example of a unicast network, each packet is sent with a header having the address and/or name of a single recipient. In an example of a multicast network, each packet is sent with a header having the address and/or group name or address of multiple recipients. In an example of a broadcast network, each packet is sent without addressing to particular groups and/or nodes.

A central office 102 may include one or more computing devices, such server(s), which may utilize a network 104, such as the internet and/or a proprietary network, for communication with a plurality of nodes 106. The central office 102 may be connected to the network 104 by any wired, optical, RF or other connection.

The nodes 106(A) through 106(H) are representative of a plurality of network devices. In the example shown, the nodes 106 are part of a smart electrical grid, and each node is associated with a metering device at a customer site. In an alternative, the nodes may be part of any network in which data is transmitted. The nodes may or may not be associated with objects, such as metering devices, products for sale, home appliances, or any other devices in the internet of things.

In the examples shown, each node 106 is configured to communicate by RF (or alternatively, by wired or optical connections) with at least one other node. Accordingly, a mesh network is configured, which allows data to move through the network in a series of hops, such as in upstream and/or downstream directions. In the example shown, software updates, commands and other data flows in a downstream direction, from the central office 102 to terminally-located nodes at the edge of the network. Also in the example, customer consumption data, voltage, current and power information, impedance measurements or calculations, etc., are transmitted in an upstream direction.

In an example of a network node 106, example detail of the node 106G is shown. A radio 108 is configured for RF communication with two upstream nodes and one downstream node. A metrology unit 110 is configured to measure voltage and current, which may be used to calculate power used over time. The radio 108 and the metrology unit 110 are in communication with a processing unit 112, which may include one or more processor(s) 114 and memory device(s) 116. Accordingly, the processor 114 may execute software located in the memory 116, to control operation of the radio 108 and metrology unit 110.

A distributed load controller 118 may be configured as executable software statements within the memory device 116, or may be configured as a hardware device, such as a gate array, processor, or other controller or device. The distributed load controller 118 is "distributed" in that similar load controllers may be present on other nodes 106.

One or more buffers 120 may be configured for storage of incoming and outgoing data. In an example, incoming data (e.g., from a first node) may be stored in the buffer 120 where it will be available for use and/or re-transmission (e.g., to a second node). In some examples, data may be moving in both the upstream and downstream directions, or be intended for a plurality of distinct purposes, resulting in need for two or more buffers (e.g., one buffer associated with each direction). Accordingly, data may be received, buffered, transmitted, and then deleted from the buffer. One or more upstream and downstream buffers 120 may each contain one or more data streams, which may vary in size, depending on incoming and outgoing data transfer rates.

The load controller 118 is configured to send feedback to nodes from which the node 106G receives data. The load controller 118 may also be configured to receive feedback from nodes to which the node transmits data. The feedback sent to node(s) from which the node receives data may instruct the node(s) to lower their transmission speed (e.g., slower kilobytes or kilobits per second). Such feedback may be appropriate if the buffer 120 of the node is overly full and/or is filling at an overly rapid rate. Similarly, feedback received by the node may instruct the node to slow a rate at which data is transmitted. In some instances, receipt of feedback may cause the node to transmit more slowly, for its buffer to fill. This may require the node to send slow-down feedback to nodes sending it data.

Figure 2:
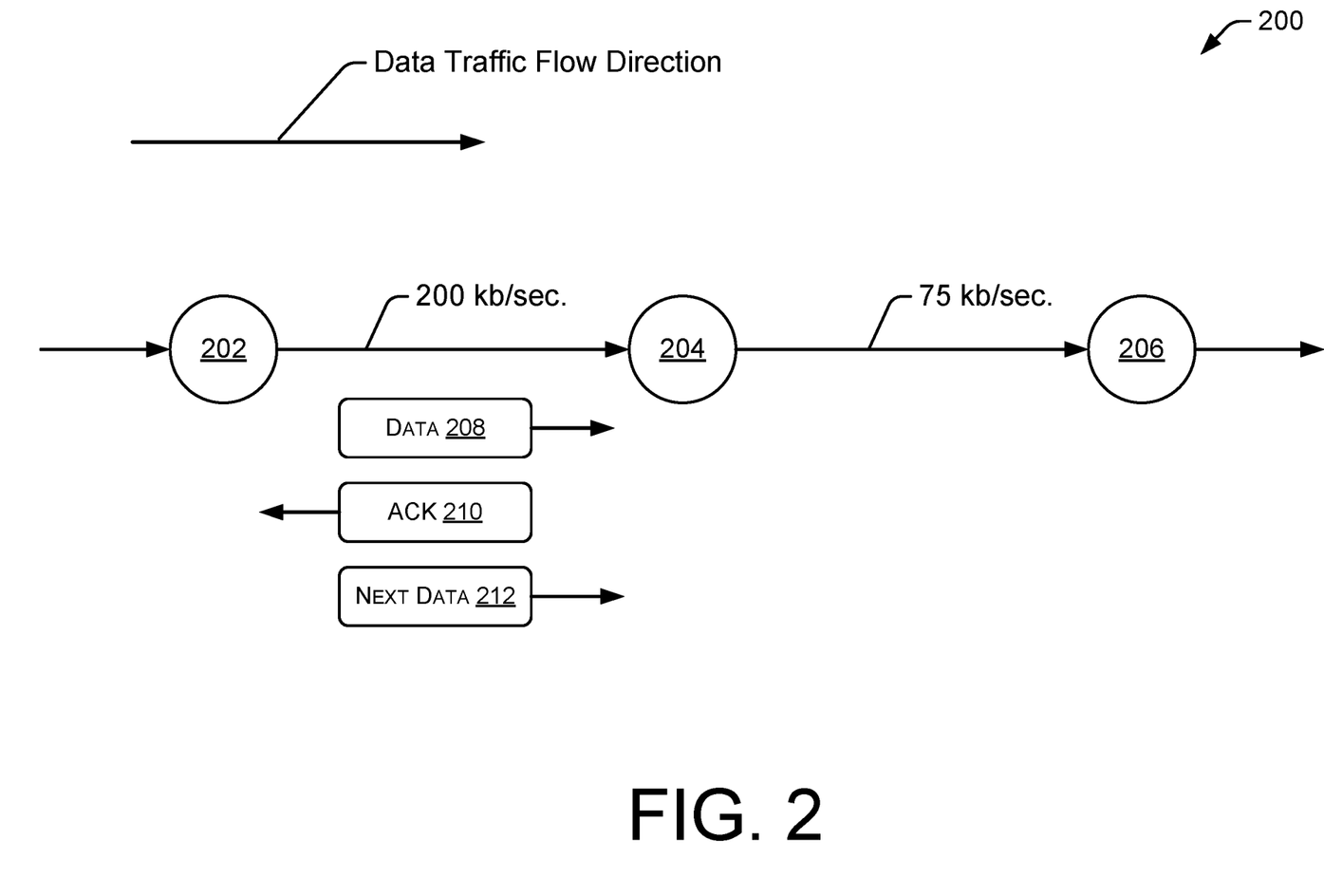
FIG. 2 is a block diagram showing a portion of an example network, showing a node that receives data from an upstream node, provides the upstream node with feedback within an acknowledgement, and transmits data to a downstream node.

FIG. 2 shows a portion of an example network 200 illustrating example of operation of a load controller in a unicast mesh network environment. In the example shown, a node receives data from an upstream node and provides feedback to the sending node to regulate the transmission rate (e.g., kilobits/second) of the node. In an optional example, the node also re-transmits the received data to a downstream node.

In FIG. 2, data 208 has been transmitted (e.g., in a unicast environment) by node 202 and is addressed to node 204. The data 208 is representative of a data packet, data block, data stream, etc. Responsive to receiving data 208, the node 204 may store the data in a buffer for later transmission to node 206. Node 204 may send an acknowledgment message 210 to node 202, indicating receipt of the data packet, block or stream. Responsive to the acknowledgement 210, node 202 may send additional or next data 212.

In the example of FIG. 2, the node 202 transmits data to node 204 at the rate of 200 kb/sec. (kilobits per second). Node 202 stores the incoming data in memory. If the data is to be transmitted to node 206, node 204 may buffer the incoming data until it is transmitted to node 206. In the example shown, the transmission rate from node 204 to node 206 is 75 kb/sec. Therefore, the incoming data rate exceeds the outgoing data rate, and a buffer of the node 204 may be rapidly filling.

The node 204 may send feedback to the node 202. In particular, since the incoming data is received at a higher rate than the outgoing data is transmitted, the buffer of the node 204 may be increasingly full. Accordingly, the feedback from the node 204, to the node 202, may request that the node 202 transmit data at a slower rate. In an example, the node 204 sends feedback requesting that the node 202 slow the transmission rate. The feedback may request that the transmission rate be reset according to a formula.

In one example, the following relationships may be used to determine a transmission level for inclusion in a feedback message. Equations 1 through 4 are shown to utilize data obtained from FIG. 2, but are of general applicability using different input and output values. Using example data from FIG. 2, Equations 1-4 can be used to calculate an Excess Bandwidth Ratio, and Requested New Transmission Rate, as:

$$\Sigma \text{ Incoming Bandwidth} = 200 \text{ kb/sec} \quad \text{(Equation 1)}$$

$$\Sigma \text{ Outgoing Bandwidth} = 75 \text{ kb/sec} \quad \text{(Equation 2)}$$

$$\sum \text{Excess Bandwidth Ratio} = \frac{\sum \text{In } Bw - \sum \text{Out } Bw}{\sum \text{In } Bw} = 0.625 \quad \text{(Equation 3)}$$

$$\text{Requested New Transmission Rate} = 200 \frac{kb}{\sec} * (1 - 0.625) = 75 \text{ kb/sec} \quad \text{(Equation 4)}$$

Equation 1 represents the summation of all incoming traffic, which in the example of FIG. 2 is data received from a single transmitting node 202. Equation 2 is the summation of all outgoing traffic, which in the example of FIG. 2 is sent to a single receiving node 206. Equations 3 and 4 show the degree to which a rate of transmission from the transmitting nodes (only node 202 in the example shown) should be reduced.

Application of Equation 3 to the data rates seen in FIG. 2, results in the calculation of an excess bandwidth ratio, which is a function of the incoming bandwidth of Equation 1 and the outgoing bandwidth of Equation 2. The result of Equation 3 may be used in Equation 4.

Application of Equation 4 to the data rates of FIG. 2 results in 200 kb/sec.*(1−0.625)=75 kb/sec. Thus, the feedback message sent by the receiving node 204, to the transmitting node 202, may request that the transmitting node reduce its transmission rate by 62.5%, to 37.5% (i.e., 1−0.625) of its original value, i.e., to 75 kb/sec. Note that if one or more transmitting nodes each reduces its transmission rate to 37.5%, then collectively the transmitting nodes would transmit at the 75 kb/sec rate by which the node 204 is transmitting.

Figure 3:
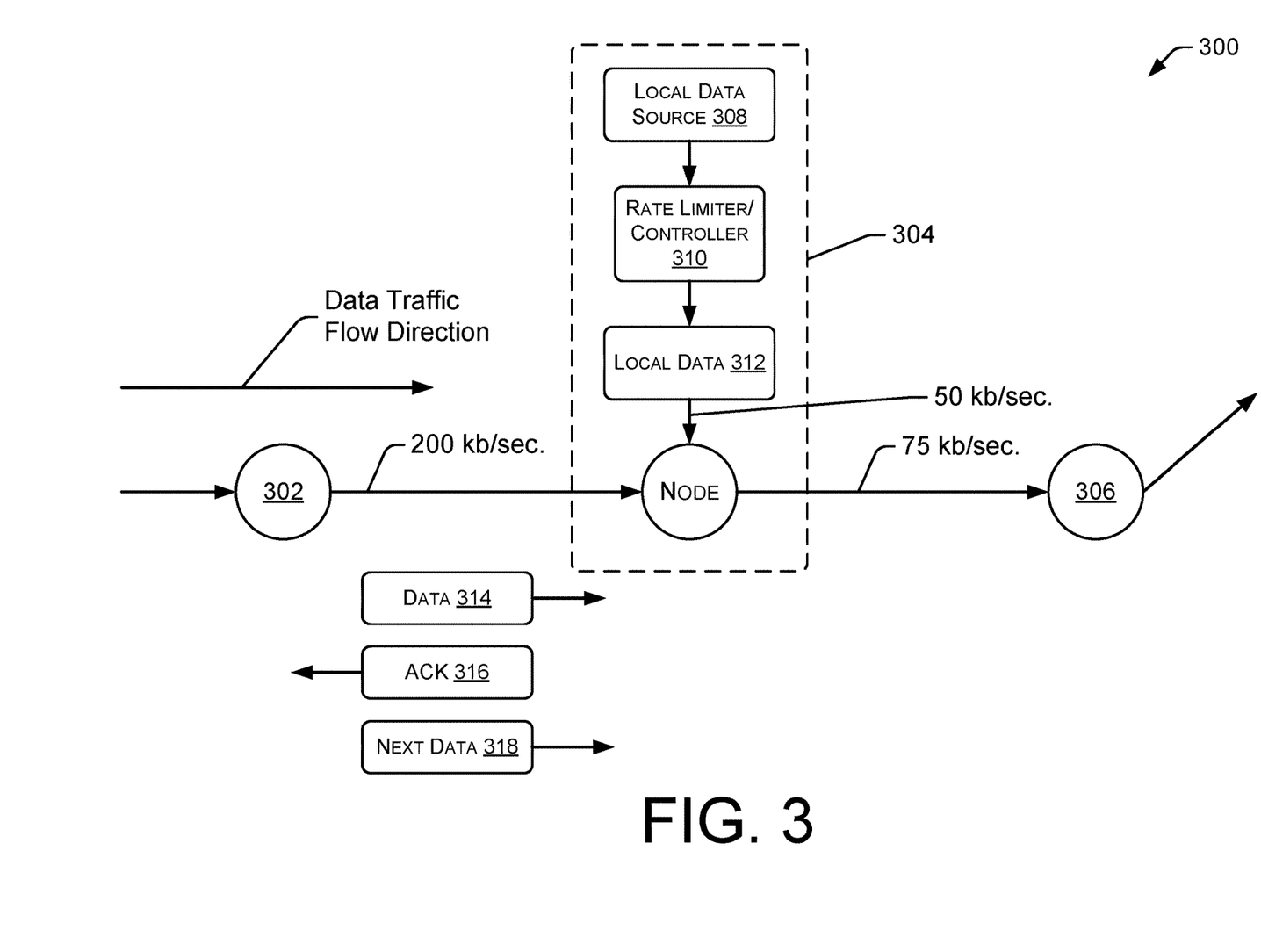
FIG. 3 is a block diagram showing a portion of an example network, showing a node that receives data from an upstream node and from a local data source, provides the data sources with feedback within an acknowledgement, and transmits data to a downstream node.

FIG. 3 shows a portion of an example network 300, showing a node 304 that receives data from an upstream node 302 and transmits data to a downstream node 306. The node 304 also receives data from a local data source 308, which may be a metrology device configured to measure voltage, current and/or power consumption of a customer. In an alternative environment, the local data source may be any device in the internet of things, such as a camera, microphone, tool, sensor, etc. In some examples, a rate limiter and/or controller 310 may be utilized to enforce a rate of transmission of data 312 from the local data source.

In the example shown, data 312 and/or 314 may be sent by the transmitting node 302, and received by the node 304. Upon data receipt, the node 304 may send an acknowledgement 316 to the transmitting note 302, which may result in the transmission of additional data 318.

The example network 300 may utilize Equations 1-3 to determine the excess bandwidth ratio. In the example of FIG. 3, application of Equation 1 results in 200 kb/sec.+50 kb/sec.=250 kb/sec. This is because the upstream source is transmitting at 200 kb/sec. and the local data source 308 is transmitting at 50 kb/sec. Application of Equation 2 results in an outgoing bandwidth of 75 kb/sec.

In the example network 300, different weights may be applied to feedback associated with the upstream data source at node 302 and the local data source 308. Equation 5 shows an example of application of a "transit weight" to an upstream data source. Equation 6 shows an example of application of a "local weight" to a local data source. In the example of FIG. 3, Equations 5 and 6 may both use the excess bandwidth ratio of 0.7 (from application of Equation 3 to the values of FIG. 3). However, use of different weights will result in different slow-down feedback sent to the upstream node 302 and the local data source 308.

The local weight, applied to a local data source, such a metrology unit within a node, may be larger or smaller than the transit weight, applied to a remote data source, such as an upstream node. The weight, local or transit, applied to a source of data, may be calculated (e.g., by the node) based at least in part on a ratio of a traffic-level, volume or contribution from the source, local or remote, divided by the sum of all traffic, local and remote, received at the node. In an example, if the local source (e.g., a metrology device) sends more traffic to the node than the remote source (e.g., an upstream node), then the computed local weight applied to data sent by the local source would be higher than the transit weight applied to data sent by the remote node. In a second example, if the remote source sends more traffic to the node than the local source, then the computed transit weight applied to data sent by the remote source would be higher than the local weight applied to data sent by the local source.

The values of the (e.g., upstream) transit weight (the "Trans_Weight" of Equation 5) and the local weight (the "Local_Weight" of Equation 6) may be selected based at least in part on the network and its design. In the example of the network 300, the transit weight is approximately 1.17 and the local weight is approximately 0.3.

$$\Sigma \text{ Excess Trans Bandwidth Ratio} = \text{Trans\_Weight} \times \Sigma \text{ Excess Bandwidth Ratio} \quad \text{(Equation 5)}$$

$$\Sigma \text{ Excess Trans Bandwidth Ratio} = \text{Local\_Weight} \times \Sigma \text{ Excess Bandwidth Ratio} \quad \text{(Equation 6)}$$

Equation 5 indicates that node 304 will ask node 302 to slow down by 0.82, or 82%. Evaluation of Equation 5 shows that the Excess Transmission Bandwidth Ratio=1.17 (the weight factor for the upstream source)*0.7 (the bandwidth ratio from Equation 3, using the numbers from FIG. 3)=0.82, i.e., the slow-down value is 82%. Accordingly (using Equation 4), node 304 will request node 302 to slow down according to a new data rate of 200 kb/sec.*(1−0.82), which is equal to a transmission rate of 36 kb/sec.

Equation 6 indicates that node 302 will ask the local source 308 to slow down by 0.21, or 21%. Evaluation of Equation 6 shows that the Excess Transmission Bandwidth Ratio=0.3 (the weight factor for the local source)*0.7 (the bandwidth ratio from Equation 3, using the numbers from FIG. 3)=0.21, i.e., the slow-down value is 21%. Accordingly (using Equation 4), node 304 will request local source 308 to slow down according to a new data rate of 50 kb/sec.*(1−0.21), which is equal to a transmission rate of 39 kb/sec.

Accordingly, the feedback to node 302, requesting a transmission rate of 36 kb/sec., and the feedback to local source 308, requesting a transmission rate of 39 kb/sec., result in a total incoming data rate of 75 kb/sec., which is equal to the outgoing data sent to node 306.

Figure 4:
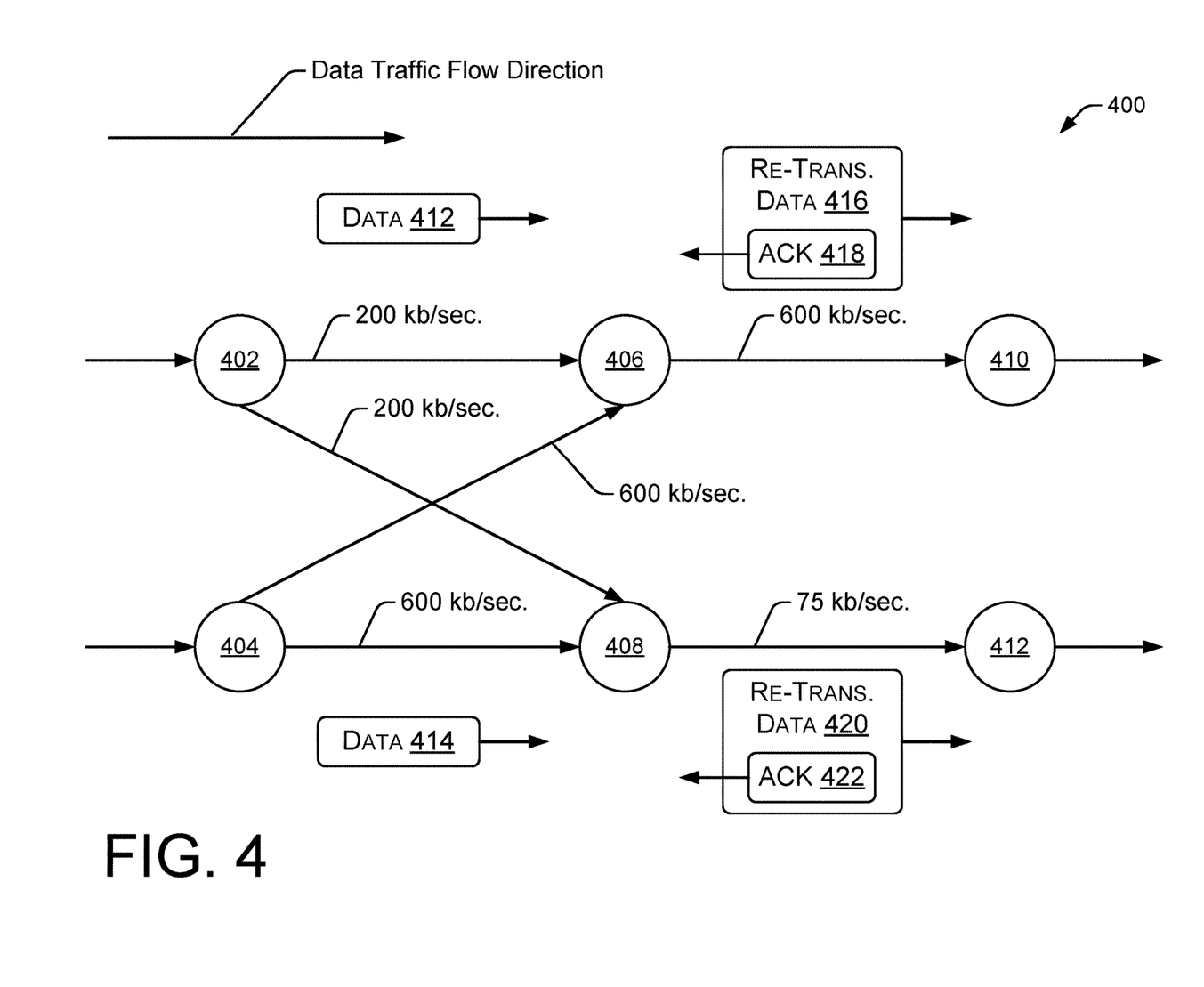
FIG. 4 is a block diagram showing distributed load-control, feedback transmission, and data transmission techniques within an example multicast network.

FIG. 4 shows distributed load-control and data transmission techniques within an example multicast network 400. Upstream nodes 402, 404 multicast data packets to downstream nodes 406, 408. Upstream nodes 402, 404 transmit at data rates of 200 kb/sec. and 600 kb/sec., respectively. In the example shown, the downstream nodes 406, 408 then pass the data further downstream to nodes 410, 412. In the example of FIG. 4, the nodes in the multicast network may be considered to be "concerned nodes" if they have sent and/or received multicast data within a threshold period of time and/or "observation window." The observation window may be 60 seconds, or a different period of time, as indicated by a design of a particular network. In an example, only feedback received from concerned nodes is used by a node to determine a new transmission rate that is based at least in part on the feedback of one or more nodes. The period of time may be the period since the previous feedback was sent. That is, a node may not be concerned with and/or reactive to, feedback from a node that has not received data from the node since sending its last feedback. Thus, while the downstream node may be requesting a slow-down from its upstream data sources, its request may not be considered by the upstream data source if the upstream data source has not actually sent data to the downstream node since the last time the downstream node has sent feedback.

Nodes 406, 408 may each use Equations 1 through 4 to generate a respective feedback value. Because nodes 406, 408 each receive data from upstream nodes 402, 404, each node 406, 408 will send its respective feedback value to each of nodes 402, 404. Calculation of a feedback value for node 406 may be performed using Equations 1 through 4. Applying Equation 1 to node 406, the incoming bandwidth is 800 kb/sec., 200 kb/sec. from node 402 and 600 kb/sec. from node 404. Applying Equation 2 to node 406, the outgoing bandwidth is 600 kb/sec. Applying Equation 3 to node 406, the Excess Bandwidth Ratio is (800−600)/800=0.25, or 25%. Applying Equation 1 to node 408, the incoming bandwidth is 800 kb/sec., 200 kb/sec. from node 402 and 600 kb/sec. from node 404. Applying Equation 2 to node 408, the outgoing bandwidth is 75 kb/sec. Applying Equation 3 to node 408, the Excess Bandwidth Ratio is (800−75)/800=0.906, or 91%. Accordingly, the nodes 402, 404 will received feedback from nodes 406, 408, asking for reductions in data transmission rates of 25% and 91%.

In the example shown, the nodes 402, 404 average the incoming requests for speed-reduction, i.e., 25% and 91%, and determine that a 58% reduction in the transmission data rate is appropriate to be used by both nodes. In the example, node 402 applies Equation 4 and determines that the new transmission rate should be 200 kb/sec.*(1−0.58), or 84 kb/sec. Node 404 also applies Equation 4 and determines that the new transmission rate should be 600 kb/sec.*(1−0.58), or 252 kb/sec. Accordingly, feedback from nodes 406, 408 results in a 58% reduction in the outgoing transmission rate by nodes 402, 404.

Nodes 402, 404 multicast data 412, 414 to each of nodes 406, 408. The data 412, 414 may be buffered by each of nodes 406, 408 and re-transmitted to one or more downstream nodes, represented by nodes 410, 412. Accordingly, nodes 406, 408 re-transmit the data as retransmitted data 416, 420. In the example shown, the re-transmitted data 416, 420 includes an acknowledgement 418, 422 of receipt of the data 412, 414. Alternatively, the acknowledgement 418, 422 may be a separate transmission. Thus, node 406 sends re-transmitted data 416, which acknowledges receipt of at least one of data 412, 414. Accordingly, nodes 402, 404 receive re-transmitted data 416 and examine the acknowledgement 418, but may ignore the data. In contrast, nodes 410, 412 receive re-transmitted data 416 and may ignore the acknowledgement 418.

Example Methods

In some examples of the techniques discusses herein, the methods of operation may be performed by one or more application specific integrated circuits (ASIC) or may be performed by one or more general-purpose processors utilizing software defined in computer readable media. In the examples and techniques discussed herein, the memory 116 may comprise computer-readable media and may take the form of volatile memory, such as random-access memory (RAM) and/or non-volatile memory, such as read only memory (ROM) or flash RAM. Computer-readable media devices include volatile and non-volatile, removable and non-removable media implemented in any method or technology for storage of information such as computer-readable instructions, data structures, program modules, or other data for execution by one or more processors of a computing device. Examples of computer-readable media include, but are not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transitory medium that can be used to store information for access by a computing device.

As defined herein, computer-readable media does not include transitory media, such as modulated data signals and carrier waves, and/or signals.

Figure 5:
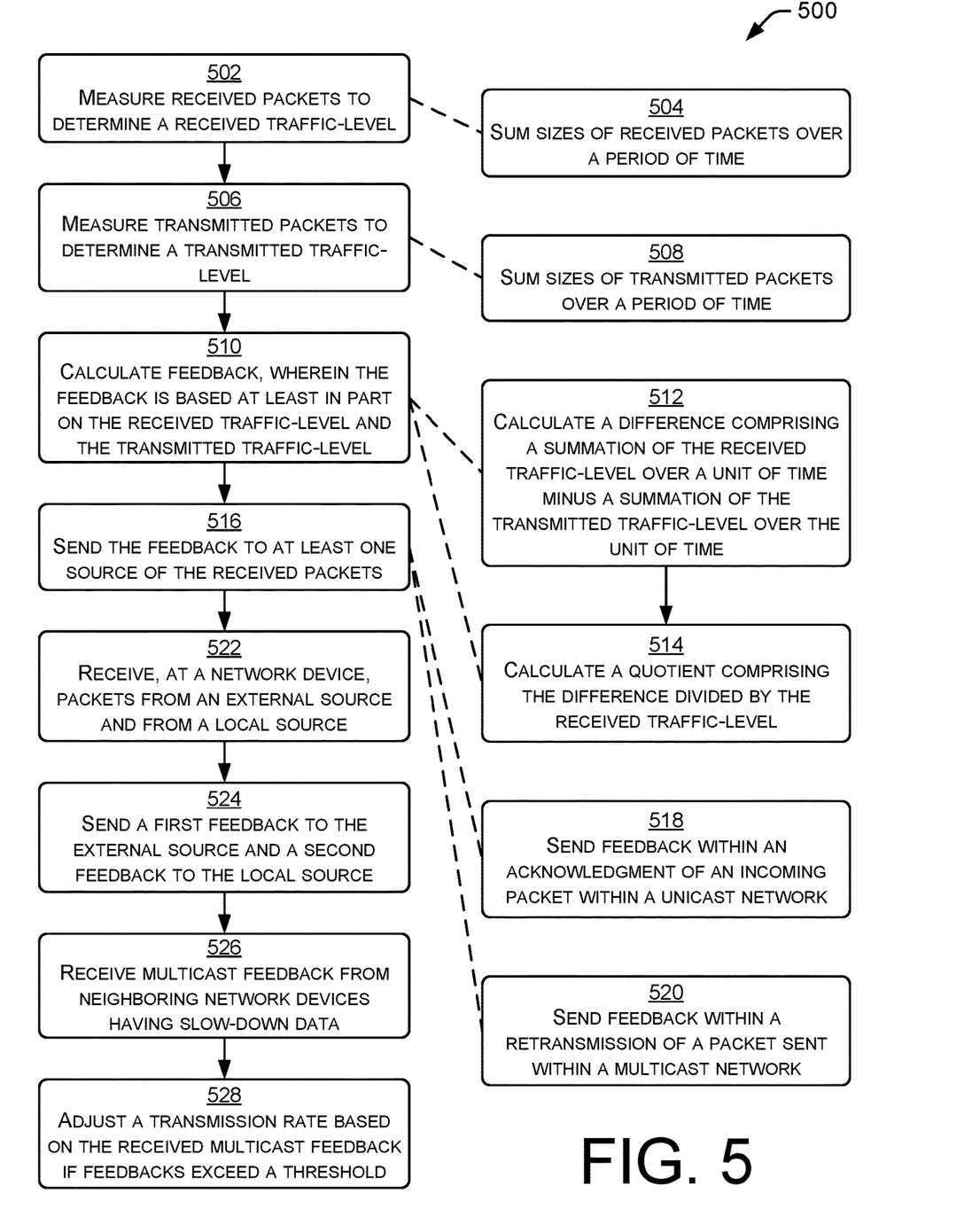
FIG. 5 is a flow diagram showing example techniques by which load-control feedback may be provided, and including example techniques for managing locally-generated data and for operating within a multicast transmission network.

FIG. 5 shows example techniques 500 to operate a network node, including example techniques to manage remotely- and locally-generated data, and example techniques to operate within a unicast, multicast and/or broadcast network. In an example of the techniques, incoming packets are received and measured to determine a received traffic-level, such as by summing sizes of received packets over a period of time. Outgoing packets are transmitted and measured to determine a transmitted traffic-level, such as by summing sizes of transmitted packets over a period of time. Feedback is sent to data sources that are upstream and/or local, and may be based at least in part on the received traffic-level and the transmitted traffic-level. The feedback may be calculated based in part on weighted factors, so that the feedback differently affects different types of data sources, such as network data sources (other network nodes) and internal data sources (e.g., a metrology device within a node). In addition to sending feedback, the node may also receive feedback, such as from nodes to which data packets are sent. Responsive to the feedback, the node may adjust the outgoing transmitted traffic-level.

At block 502, a network node may be operating in a unicast, multicast and/or broadcast network. The node may receive packets from one or more other network node(s) and/or data generators within the node. A cumulative size of the received packets is measured to determine a received traffic-level. In the example of FIG. 2, data 208 is received (e.g., from node 202) and measured by node 204. In the example of FIG. 3, data 312 is received from a local data source 308 (e.g., a metrology device), and data 314 is received from an upstream node 302. In the example of FIG. 4, multicast data is received at nodes 406, 408 from upstream nodes 402, 404. Equation 1 is an example of the incoming bandwidth. At block 504, the received data-rate or received traffic-level may be calculated, such as in kilobits per second. The calculation may involve summing sizes of received packets over time to calculate a data rate and/or a total data volume since a particular time and/or over a period of time.

At block 506, the network node may also transmit data in the unicast, multicast and/or broadcast network. The node may transmit packets to one or more other network node(s) as part of upstream or downstream data flow(s). An aggregate size of the transmitted packets is measured to determine a transmitted traffic-level. In the example of FIG. 2, data transmitted from node 204 to node 206 may be measured by node 204. In the example of FIG. 3, data transmitted from node 304 to node 306 may be measured by node 304. In the example of FIG. 4, a quantity of, or rate of, data transmitted in a multicast environment from nodes 406, 408 to nodes 410, 412 may be measured. Equation 2 is an example of the outgoing bandwidth. At block 508, the transmitted data-rate or transmitted traffic-level may be calculated, such as in kilobits per second. The calculation may involve summing sizes of transmitted packets over time to calculate a data rate and/or a total data volume since a particular time and/or over a period of time.

At block 510, feedback may be calculated, such as for transmission to source(s) of received data. The feedback is an indication to data transmitting nodes of whether too much, too little, and/or the correct amount of data is being sent per unit of time. The calculation of the feedback may be based at least in part on the received-data traffic-level and the transmitted-data traffic-level. The calculation may be performed according to the example of blocks 512, 514 (which show the relationship of Equation 3) and the calculation of a requested new transmission rate, at Equation 4. At block 512, a difference, comprising a summation of the received traffic-level over a unit of time minus a summation of the transmitted traffic-level over the unit of time, is calculated. At block 514, a quotient comprising the difference divided by the received traffic-level is calculated. The resulting excess bandwidth ratio, seen in Equation 3, can be used in Equation 4 to create a new requested new transmission rate, which may be used as feedback sent to an upstream and/or transmitting node.

At block 516, the feedback is sent to at least one source of the received data. At block 518, in an example within a unicast network, feedback may be sent within an acknowledgement of an incoming packet. Accordingly, the data-receiving node acknowledges the receipt of the data, and at intervals also provided feedback (possibly within the same acknowledgement message) requesting a data speed-up or slow-down. Examples of such acknowledgement are seen at FIGS. 2 and 3. At block 520, in an example within a multicast network, feedback may be sent within a re-transmission, to a downstream node, of a packet sent by an upstream node. Accordingly, a node may receive a packet, add feedback to the packet, and sent the packet. The packet would be received by the upstream node, which would examine the feedback, but ignore the data. The packet would also be received by the downstream node, which would examine the data, but ignore the feedback. An example of such acknowledgement is seen at FIG. 4.

At block 522, data, a data stream, and/or data packets may be received by the network node or device that were sent by an external source (e.g., an upstream node) and/or a local source (e.g., a metrology unit of an electricity metering device). FIG. 3 shows an example of a node 304 that receives data from an external source (node 302) and a local source 308. At block 524, a first feedback may be sent to the external data source and a second feedback may be sent to the local data source. The feedbacks may be different or the same, i.e., the feedbacks may request a different, or a same, rate of slow-down. In one example, the difference within the calculation of the requested slow-down may be caused by weights used to calculate each feedback. Equations 5 and 6 are examples of weights that may be applied to the calculation of feedback. A "transit weight" may be used to calculate feedback sent by the node to a different network device. A "local weight" may be used to calculate feedback sent by the node to a local device within the node. In a more general example, the first feedback and the second feedback may be based at least in part on a first weight and a second weight, respectively.

At block 526, in a unicast, multicast and/or broadcast network, feedback from neighboring node(s) may be received. Accordingly, a node may both send and receive feedback. If two or more feedback messages are received from neighboring nodes (e.g., within a window of time), the messages may be the same (i.e., indicate the same slow-down request) or different. In the example multicast environment of FIG. 4, at least two of the two or more neighboring network devices send different slow-down requests. Accordingly, for a given data flow, a node will send feedback to node(s) that are upstream from the node (i.e., nodes from which the node received data), and the node will receive feedback from downstream node(s), to which it sends data.

At block 528, a transmission rate is adjusted based at least in part on the received feedback. In an example, the feedback is not ignored if the feedback, considered alone or in combination with other feedback, exceeds a threshold. In a particular example, two or more feedbacks (e.g., slow-down requests, e.g., based on a percentage of a transmission rate) may be averaged, and the average feedback used by the feedback-receiving node. In a further example, feedback may be ignored by the feedback-receiving node, if the feedback, or an average, median, or other function of the feedback, is not greater than a threshold value.

In an example, a first transmission rate, used during the observation window, may be replaced with a second transmission rate that is slower than requested by a first feedback and that is faster than requested by a second feedback, wherein the first feedback and the second feedback are from among the received multicast feedback from two or more neighboring network devices. In some examples, the first feedback and the second feedback are based at least in part on a first weight and a second weight, respectively.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method of managing network traffic, comprising:
    under control of one or more processors configured with executable instructions:
    measuring received packets to determine a received traffic-level;
    measuring transmitted packets to determine a transmitted traffic-level;
    calculating a difference comprising a summation of the received traffic-level over a unit of time minus a summation of the transmitted traffic-level over the unit of time;
    calculating a quotient comprising the difference divided by the received traffic-level; and
    determining feedback based at least in part on:
        the calculated difference; and
        the calculated quotient; and
    sending the determined feedback to at least one source of the received packets to request a transmission slow-down or speed-up.

2. The method of claim 1, wherein the measuring received packets comprises:
    summing sizes of the received packets over a period of time.

3. The method of claim 1, wherein the measuring transmitted packets comprises:
    summing sizes of the transmitted packets over a period of time.

4. The method of claim 1, additionally comprising:
    receiving packets from a first source device and a second source device at a network device comprising the one or more processors; and
    sending, from the network device, a first feedback to the first source device and a second feedback to the second source device.

5. The method of claim 1, additionally comprising:
    receiving, at a network device, packets from a first source device external to the network device over a network and from a second source device local to the network device; and
    sending, from the network device, the determined feedback to the first source device and a second feedback to the second source device, wherein:
        the determined feedback and the second feedback are based at least in part on a first weight and a second weight, respectively.

6. The method of claim 1, wherein the sending the determined feedback comprises:

sending the determined feedback within an acknowledgment of an incoming packet sent within a unicast transmission.

7. The method of claim 1, wherein the sending the determined feedback comprises:
sending the determined feedback within a retransmission of a packet sent within a multicast transmission.

8. The method of claim 1, additionally comprising:
receiving a first feedback from a first neighboring network device and receiving a second feedback from a second neighboring network device, wherein the first feedback and the second feedback comprise different slow-down data requests;
determining that an average of the first feedback and the second feedback exceeds a threshold; and
adjusting a transmission rate based at least in part on the determined average of the first feedback and the second feedback.

9. The method of claim 1, additionally comprising:
receiving a first feedback from a first neighboring network device and a second feedback from a second neighboring network device during an observation window, wherein the first feedback and the second feedback comprise different slow-down data requests;
applying a first weight to the first feedback;
applying a second weight to the second feedback; and
replacing a first transmission rate, used during the observation window, with a second transmission rate that is slower than requested by the first feedback and that is faster than requested by the second feedback.

10. A device, comprising:
a processor;
a memory in communication with the processor;
a sensor device, configured to measure resource consumption, in communication with the processor; and
instructions, stored in the memory, which when executed by the processor configure the device to perform actions comprising:
measuring received data to determine a received traffic-level, wherein the received data comprises data from the sensor device and data from a remote computing device;
measuring transmitted data to determine a transmitted traffic-level;
calculating a first feedback and a second feedback based at least in part on acts comprising:
applying a local weight to traffic from the sensor device; and
applying a transit weight to traffic from the remote computing device; and
sending the first feedback to the remote computing device and the second feedback to the sensor device, wherein the first and second feedbacks are different.

11. The device as recited in claim 10, wherein the instructions perform additional acts comprising:
calculating the first feedback and the second feedback a plurality of times; and
for each calculation, re-sending the first feedback and the second feedback to the remote computing device and the sensor device, respectively.

12. The device as recited in claim 10, wherein the instructions perform additional acts comprising:

calculating each of the first feedback and the second feedback once per unit of time; and
for each calculation, re-sending the first feedback and the second feedback to the remote computing device and the sensor device, respectively.

13. The device as recited in claim 10, wherein the instructions further configure the device to perform additional acts comprising:
if the sensor device sends more traffic to the device than the remote computing device, applying a higher value as the local weight for data sent by the sensor device than a value of the transit weight for data sent by the remote computing device; and
if the remote computing device sends more traffic to the device than the sensor device, applying a higher value as the transit weight for data sent by the remote computing device than a value of the local weight for data sent by the sensor device.

14. The device as recited in claim 10, wherein the instructions perform additional acts comprising:
transmitting data to an additional device downstream from the device;
receiving a third feedback from the additional device; and
adjusting a transmission rate associated with the device based at least in part on the received third feedback.

15. The device as recited in claim 10, wherein the first and second feedbacks are both based at least in part on:
the received traffic-level; and
the transmitted traffic-level.

16. A method of managing network traffic, comprising:
receiving, at a computing device, first data associated with a first device local to the computing device;
receiving, at the computing device, second data associated with a second device remote from the computing device;
determining a received traffic-level based at least in part on the received first data and the received second data, wherein the received traffic level indicates an amount of traffic received at the computing device;
measuring transmitted data from the computing device to determine a transmitted traffic-level, wherein the transmitted traffic-level indicates an amount of traffic transmitted from the computing device; and
calculating a first feedback and a second feedback based at least in part on:
applying a local weight to traffic from the first device; and
applying a transit weight to traffic from the second device; and
sending the first feedback to the first device and the second feedback to the second device, wherein the first and second feedbacks are different.

17. The method of claim 16, wherein the first data is resource consumption data associated with the first device.

18. The method of claim 16, wherein the second data indicates a level of traffic associated with a second device.

19. The method of claim 16, wherein the first device local to the computing device is a sensor device.

20. The method of claim 16, wherein the measuring transmitted data includes summing sizes of the transmitted data over a period of time.

* * * * *